US010389667B2

(12) United States Patent
Offenhartz et al.

(10) Patent No.: US 10,389,667 B2
(45) Date of Patent: Aug. 20, 2019

(54) HIGH VALUE MESSAGE THREADING MODEL

(71) Applicant: SuccessFactors, Inc., South San Francisco, CA (US)

(72) Inventors: John Offenhartz, San Francisco, CA (US); Filiberto Selvas, San Carlos, CA (US); Stella Konopski, Vancouver (CA); Negin Mahmoodi, Vancouver (CA)

(73) Assignee: SUCCESSFACTORS, INC., South San Francsico, CA (US)

( * ) Notice: Subject to any disclaimer, the term of this patent is extended or adjusted under 35 U.S.C. 154(b) by 376 days.

(21) Appl. No.: 14/825,970

(22) Filed: Aug. 13, 2015

(65) Prior Publication Data

US 2017/0048177 A1 Feb. 16, 2017

(51) Int. Cl.
*G06F 15/16* (2006.01)
*H04L 12/58* (2006.01)
*G06F 3/0482* (2013.01)
*G06F 3/0485* (2013.01)

(52) U.S. Cl.
CPC ............ *H04L 51/16* (2013.01); *G06F 3/0482* (2013.01); *G06F 3/0485* (2013.01); *H04L 51/26* (2013.01)

(58) Field of Classification Search
CPC ......... H04L 51/16; H04L 51/26; H04L 12/58; G06F 3/04817; G06F 3/04842; G06F 3/0484; G06F 3/0481
See application file for complete search history.

(56) References Cited

U.S. PATENT DOCUMENTS

| 8,522,168 B2* | 8/2013 | Williams | G06F 3/0482 709/204 |
| 2002/0070984 A1* | 6/2002 | Newman | H04L 12/58 715/853 |
| 2007/0150541 A1* | 6/2007 | Carroll | G06Q 10/107 709/206 |
| 2007/0282956 A1* | 12/2007 | Staats | G06Q 10/107 709/206 |
| 2010/0211889 A1* | 8/2010 | Durazo | G06Q 10/107 715/752 |
| 2015/0088784 A1* | 3/2015 | Dhara | G06N 5/02 706/11 |

* cited by examiner

*Primary Examiner* — Cheikh T Ndiaye
(74) *Attorney, Agent, or Firm* — Fountainhead Law Group P.C.

(57) ABSTRACT

Systems and methods for debugging in a production environment are disclosed. An example method includes receiving, by a processor, a discussion thread that includes a plurality of first level posts and a reply grouping that contains a plurality of second level posts, wherein each of the plurality of second level posts are made in response to the first level post or a second level post from the plurality of second level posts. The method then presents, by the processor, the plurality of first level posts according to a first sorting order. The method then presents, by the processor, at least some of the plurality of second level posts from the plurality of first level posts according to a second sorting order that is different than the first sorting order.

20 Claims, 8 Drawing Sheets

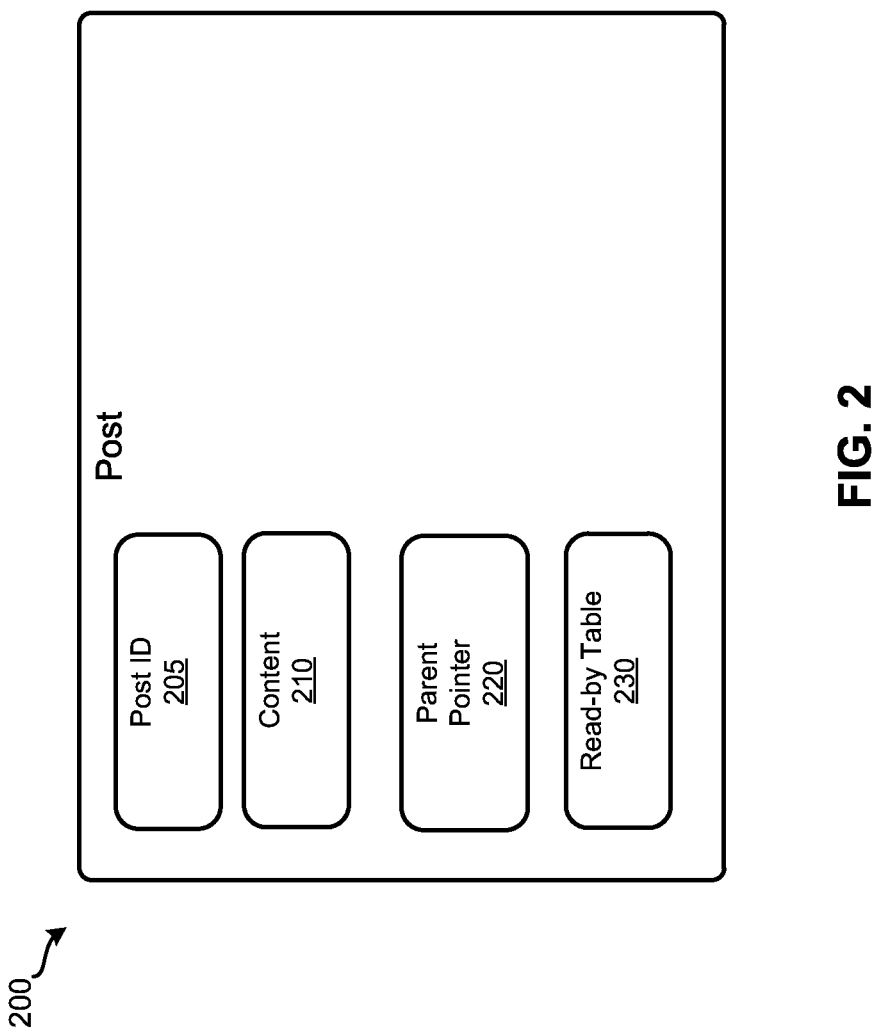

US 10,389,667 B2

HIGH VALUE MESSAGE THREADING MODEL

BACKGROUND

Traditional message threading models rely on simple sorting mechanisms to present posts within a discussion thread to a user. For example, a user can sort the posts by "oldest first" or "newest first" so that the discussion thread represents a timeline of posts. However, these techniques are suboptimal since they do not provide the user a concise snapshot of the content within the discussion thread. For example, it may be difficult to simultaneously understand the history of the discussion thread and review new posts in the discussion thread.

There is therefore a need for improved techniques to debug in a production environment.

SUMMARY

In one embodiment, a computer-implemented method receives, by a processor, a discussion thread that includes a plurality of first level posts and a reply grouping that contains a plurality of second level posts, wherein each of the plurality of second level posts are made in response to the first level post or a second level post from the plurality of second level posts. The method then presents, by the processor, the plurality of first level posts according to a first sorting order. The method then presents, by the processor, at least some of the plurality of second level posts from the plurality of first level posts according to a second sorting order that is different than the first sorting order.

In one example, the plurality of first level posts are made in response to a topic of interest.

In another example, first sorting order is user defined as one of oldest-first, newest-first, most-likes-first, and most-responses-first. The second sorting order can be predefined as oldest-first.

In another example, presenting at least some of the plurality of second level posts comprises identifying, by the processor, a subset of second level posts from the plurality of second level posts which have been previously read by a user account, presenting, by the processor, the remaining second level posts from the plurality of second level posts other than the subset, and presenting, by the processor, an icon in between the first level post and the presented second level posts, wherein the icon represents the subset of second level posts which have been previously read.

In another example, the method further includes detecting, by the processor, selection of the icon and presenting, by the processor, the subset of second level posts inline with the presented second level posts in response to the detection, wherein the subset of second level posts and the remaining second level posts are organized according to the second sorting order.

In another example, the presentation of the plurality of second level posts extend outside an available area configured for presenting the discussion thread, wherein the identifying the subset, presenting the remaining second level posts, wherein the icon is presented in response to the determination.

In another embodiment, a non-transitory computer readable storage medium stores one or more programs comprising instructions for: receiving a discussion thread that includes a plurality of first level posts and a reply grouping that contains a plurality of second level posts, wherein each of the plurality of second level posts are made in response to the first level post or a second level post from the plurality of second level posts, presenting the plurality of first level posts according to a first sorting order, and presenting at least some of the plurality of second level posts from the plurality of first level posts according to a second sorting order that is different than the first sorting order.

In another embodiment, a computer implemented system comprises one or more computer processors memory; and one or more programs. The one or more programs are stored in the memory and configured to be executed by the one or more processors. The one or more programs include instructions for: receiving a discussion thread that includes a plurality of first level posts and a reply grouping that contains a plurality of second level posts, wherein each of the plurality of second level posts are made in response to the first level post or a second level post from the plurality of second level posts, presenting the plurality of first level posts according to a first sorting order, and presenting at least some of the plurality of second level posts from the plurality of first level posts according to a second sorting order that is different than the first sorting order.

The following detailed description and accompanying drawings provide a better understanding of the nature and advantages of the present disclosure.

BRIEF DESCRIPTION OF THE DRAWINGS

FIG. 2 illustrates an exemplary post according to one embodiment.

DETAILED DESCRIPTION

Described herein are techniques for presenting a discussion thread on a display window. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

The implementations described herein provide various technical solutions for displaying a discussion thread on a display window. A discussion thread can consist of many posts (e.g., comments, messages, replies, responses, etc.). A first level post can be in response to a topic of interest. Second level posts can be replies or responses to a first level post. As such, a parent-child relationship is created. In some embodiments, a post can be in response to a second level can be a third level post or remain a second level post, depending on the underlying data structure of the discussion thread. Techniques described herein are capable displaying first level posts according to a first sorting order while displaying second level posts in a second sorting order that is different than the first sorting order. In some embodiments, posts which have already been reviewed by the viewer can also be hidden from the display window which provides more viewing area in the display window for posts which have not been reviewed by the viewer. In other embodiments, each displayed post can include a link to the parent of the post. When the link is selected, the parent of the post can be displayed in the display window to provide context to the displayed post. For example, reviewing the parent of a post containing the phrase "That's a great idea" can provide context to what the idea was.

Figure 1:
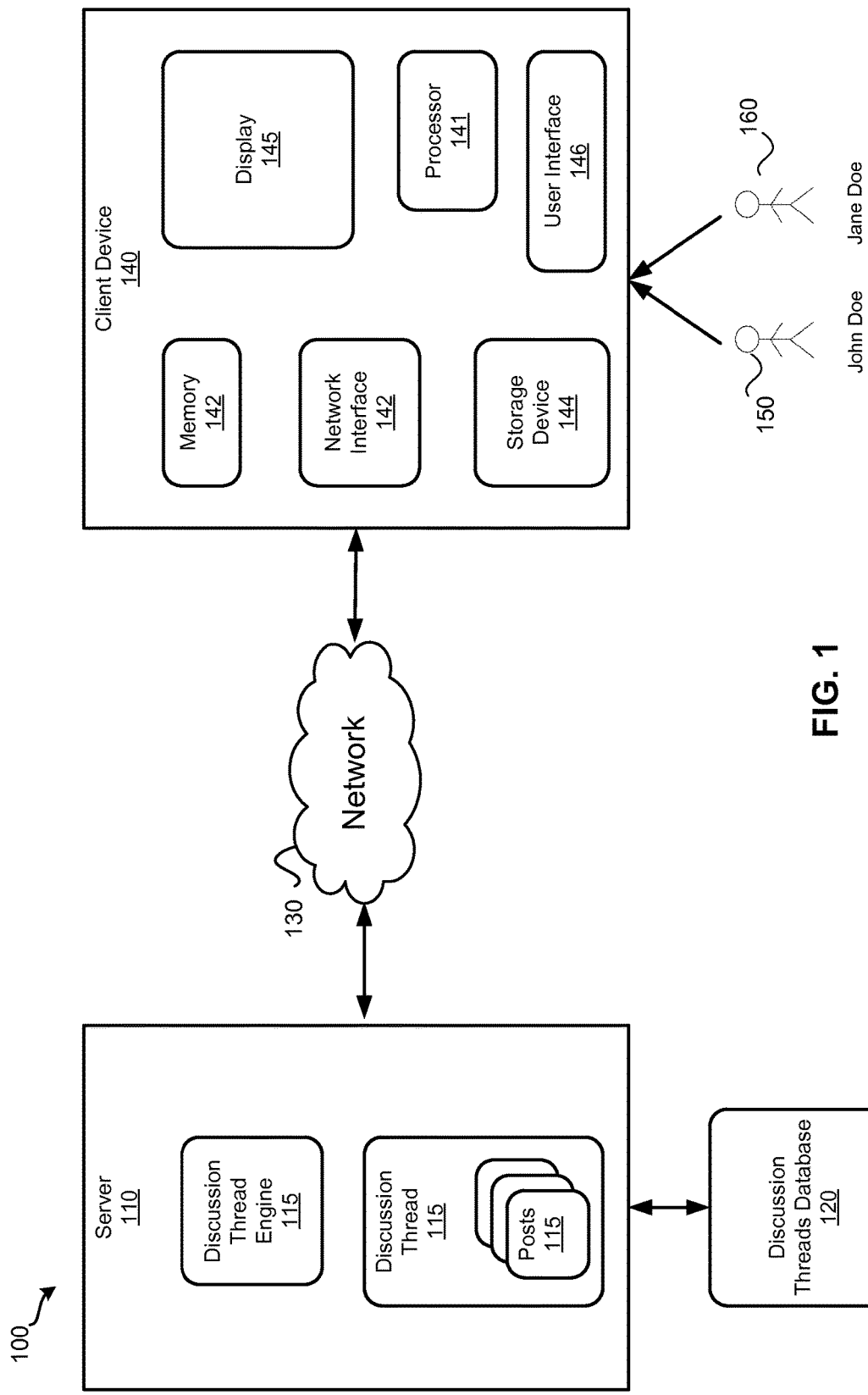
FIG. 1 illustrates a system for displaying discussion threads according to one embodiment.

FIG. 1 illustrates a system for displaying discussion threads according to one embodiment. System 100 includes server 110, discussion threads database 120, network 130, and client device 140. Server 110 includes discussion thread engine 115 which is configured to retrieve discussion thread 115 from discussion threads database 120 and to generate a visual representation of discussion thread 115 to be presented on display 145 of client device 140. Once the visual representation is generated, server 110 can transmit the visual representation to client device 140 via network 130. While discussion thread engine 115 is shown here as being part of server 110, it is to be understood that discussion thread engine 115 can also be implemented within client device 140 in other embodiments.

Client device 140 can be a portable electronic device that is operated by one or more employees of an organization. In one example, each employee may have his or her own client device. In another example, multiple employees may share a single client device. Client device 140 includes processor 141, memory 142, network interface 143, storage device 144, display 145, and user interface 146. Processor 121 can execute a browser application stored in memory 142 or storage device 144. The browser application allows a user to view and interact with discussion threads. Here, system 100 includes user 150 named "John Doe" and user 160 named "Jane Doe." User 150 can log into client device 140 by providing a secure identifier, such as a username/password or a private token. Once logged into client device 140, processor 141 can execute the browser application. The browser application can transmit requests through network 130 to discussion thread engine 115. The requests can be to retrieve a desired discussion thread. Discussion thread engine 115 can generate a visual representation of the discussion thread to be presented on display 145. User 150 can interact with the visual representation on display 125 through user interface 126. The interactions can to navigate or review other portions of discussion thread 115. In other embodiments, client device 140 can communicate with discussion threads database 120 via network 130 and temporarily store discussion thread 115 within storage device 144 or memory 142. A discussion thread engine 115 implemented within client device 140 can process discussion thread 115 to generate a visual representation of the discussion thread to be presented on display 145. There can be some advantages to processing the discussion thread on client device 140 rather than server 110. For instance, one advantage is that processing the discussion thread on client device 140 can reduce the lag time to process a request since the request does not need to be transmitted from the client device 140 to server 110 and the response does not need to be transmitted from server 110 to client device 140.

Each post within discussion thread 115 can store different types of information. The information can include content for the post or metadata that is used during presentation of discussion thread 115. FIG. 2 illustrates an exemplary post according to one embodiment. Post 200 includes post ID 205, content 210, parent pointer 220, and read-by table 230. Post ID 205 can store a unique identifier associated with post 200. The unique identifier can be used to identify post 200 from other posts within the discussion thread or within discussion threads database. Content 210 can store the content of post 200. The content can include a message and an author of the message. Content 210 can store the message as a text string and the author's name as another text string. Parent pointer 220 can store a pointer to another post. The post ID of the other post can be stored within parent pointer 220. In one embodiment, parent pointer 220 can store the post ID of the post in which the current post is in response to. For instance, the discussion thread includes post A and post B which is a reply to post A. The parent pointer of post B can store the post ID of post A to create a hierarchy and allow posts to backtrack to the posts in which they were created in response to. Read-by table 230 store a table configured to track viewers who have read the post. The table can be a look up table, a hash table, or other data structure capable of determining whether a viewer has read the post based on the viewer's viewer ID. Advantages to tracking the posts which have been read by a viewer can include optimizing the discussion thread to display posts which have yet to be read by the viewer.

Figure 3A:
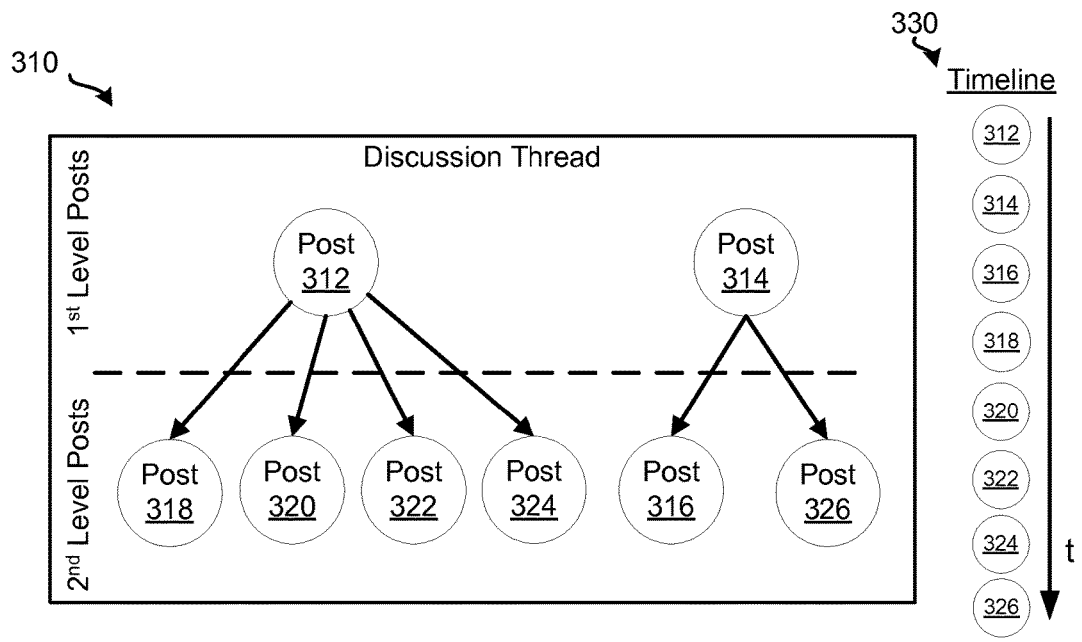
FIG. 3A illustrates a discussion thread according to one embodiment. Discussion thread 310 can be stored in discussion threads database 120.

FIG. 3A illustrates a discussion thread according to one embodiment. Discussion thread 310 can be stored in discussion threads database 120. Discussion thread engine 115 can access discussion thread 310 and generate a graphical user interface for interacting with and exploring the contents of the discussion thread. Client device 140 can present the graphical user interface within a display window of display 145. The discussion thread engine 115 can be located on the server side or the client side. In server side implementations, the discussion thread engine located on the server end can process a discussion thread and transmit data to a client device. The client device can in turn process the data to present the discussion thread in a display window of the client device. In client side implementations, the discussion thread engine located on the client device can receive the discussion thread (which can be stored locally or remotely) and generate a visualization of the discussion thread to be presented within a display of the client device. The selection of posts and the appearance of the posts in the visualization can depend on the available area in the display window.

Here, discussion thread 310 is stored in a hierarchical model containing first level posts and second level posts. In other implementations, the number of levels can vary. First level posts are posts or comments which are directly related to a subject or topic of interest associated with the discussion thread. For example if the discussion is related to an article (or other intangible item), then first level posts would be comments which are directly related to the article. Similarly if the discussion is related to the topic of bicycles, then first level posts can be directly related to the topic of bicycles. In contrast, second level posts are replies or responses. The replies or responses can be derived from an existing post within the discussion thread. For example, a second level post can be a response to a first level post. As another example, a second level post can be a response to an earlier second level post. As shown in timeline 330, posts 312, 314, 316, 318, 320, 322, 324, and 326 are created in a specified order. Post 132 was created before post 314, post 314 was created before post 316, and so on.

Here, post 312 and 314 are first level posts which were created to discuss a subject or topic of interest associated with discussion thread 310. Posts 318, 320, 322, and 324 are second level posts which were created in reply to post 312. These second level posts can form a reply grouping containing posts which are in response to post 312.

Figure 3B:
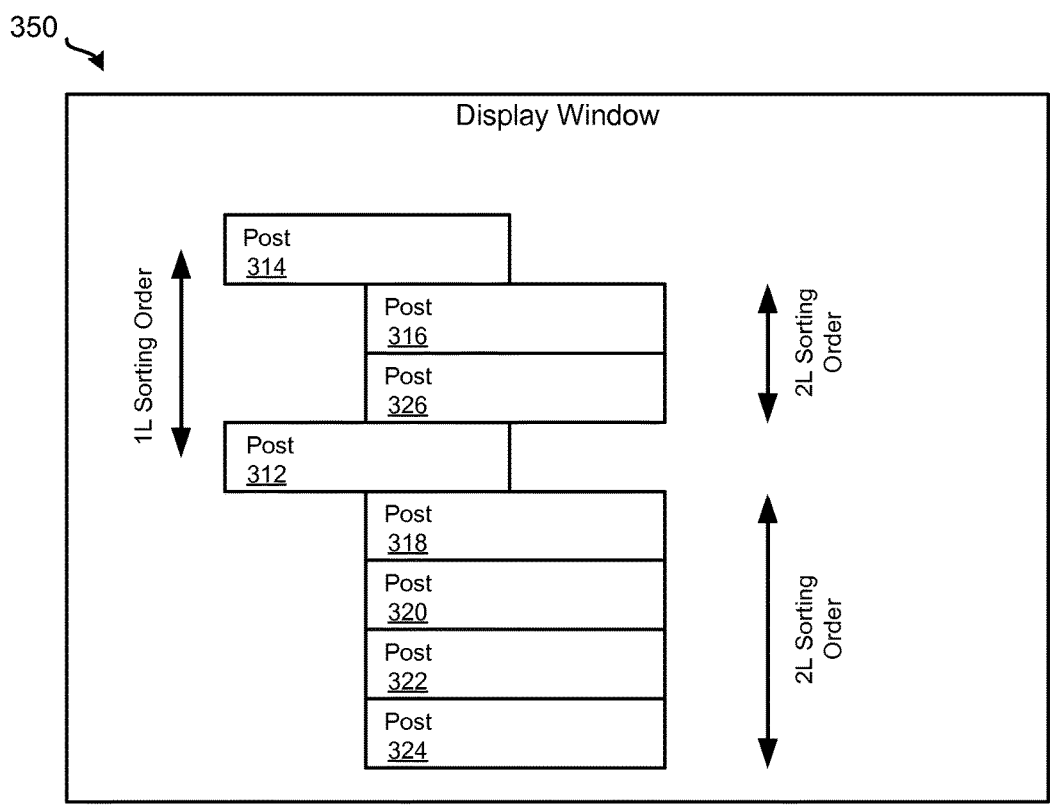
FIG. 3B illustrates a graphical representation of discussion thread 310 of FIG. 3A presented within a display window according to one embodiment.

FIG. 3B illustrates a graphical representation of discussion thread 310 of FIG. 3A presented within a display window according to one embodiment. Client device 140 can present display window 350 on display 145 as a visualization of the discussion thread. The client device can be operated by a viewer who is requesting the discussion thread. The viewer may have logged into the client device using a viewer profile belonging to the viewer. As described herein, a discussion thread engine (located either on the server side or the client side) can generate the user interface for display in display window 350. Discussion thread engine can present the posts within the discussion thread in a manner which is simple for the user to follow the discussion. For example, first level posts may be presented in a similar fashion and second level posts can be presented also in a similar fashion. Here, first level posts (posts 312 and post 314) are presented with a first indentation. Similarly, second level posts are presented with a second indentation. The indentation of the post assists the viewer in distinguishing first level posts from second level posts. Furthermore, replies to a first level post are grouped together as a reply grouping underneath the first level post. This allows the viewer to quickly determine the parent-child (or post-reply) relationship between posts. Here, posts 316 and 326 form a reply grouping of second level posts that are in response to post 314. Similarly, posts 318, 320, 322, and 324 are form a reply grouping of second level posts that are in response to post 312. Each post can be presented with the content of the post. Depending on the implementation, the message of the post and/or the author of the post can be presented in display window 350.

Discussion thread engine 115 can sort posts within the discussion thread in accordance to a sorting order. Exemplary sorting orders include oldest-first (e.g., oldest posts are presented first and newest posts presented last), newest-first (e.g., newest posts are presented first and oldest posts are presented last), popular-first (e.g., most viewed posts are presented first and least viewed posts are presented last), and liked-first (e.g., posts with the most likes are presented first and posts with the least likes are presented last). In some embodiments, discussion thread engine 115 can sort different level posts using different sorting orders. For example, first level posts can be sorted by a first sorting order while second level posts can be sorted by a second sorting order.

Second level posts can be sorted in accordance to their reply grouping. Thus posts in a first reply grouping can be sorted independently of posts in a second reply grouping. In one embodiment, the second sorting order can be preset while the first sorting order is viewer-defined. For example, the second sorting order can be set to always sort second level posts oldest-first while the first sorting order can be set by the viewer. As shown in FIG. 3B, the discussion thread is being presented in display window 350 with the first level sorting order set by the viewer as newest-first while the second level sorting order being preset to oldest-first. As shown, post 314 is being presented first followed by port 312 in accordance to newest-first sorting order. For the two second level reply groupings, the posts within each reply grouping are sorted in accordance to oldest-first sorting order. Post 316 is being presented first followed by post 326 in accordance to oldest-first sorting order. Post 318 is followed by post 320, 322, and 324 also in accordance to oldest-first sorting order.

In some embodiments, discussion thread engine 115 can be configured to selectively present some posts in the discussion thread while hiding other posts in the discussion thread. In one embodiment, discussion thread engine 115 can hide posts which have already been read/viewed/reviewed by the viewer. Advantages to hiding these posts can include reducing the amount of content that is being presented to the user. This can focus the viewer on posts which the viewer has not read rather than reviewing posts which the viewer has read. Discussion thread engine 115 can determine whether a post has been read/viewed/reviewed by a viewer by accessing read-by table 230 of the post. For example, discussion thread engine 115 can provide as input the viewer ID of the viewer to read-by table 230 and receives a TRUE/FALSE statement in return where TRUE means that the viewer has read the post while FALSE means that the viewer has not read the post. When discussion thread engine 115 detects that the viewer has read/viewed/reviewed a post, discussion thread engine 115 can update read-by table 230 to accurately store the state of the post. In some embodiments, hiding posts can apply to one or more post levels. For example, hiding posts can apply to second level posts but not first level posts, or vice versa.

Figure 4A:
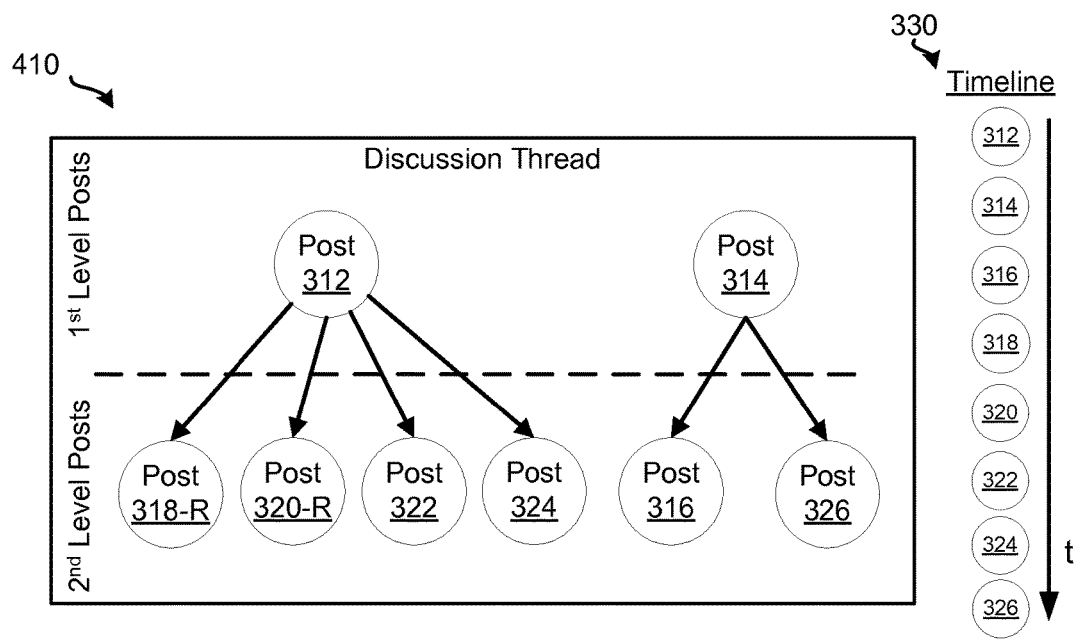
FIG. 4A illustrates an exemplary discussion thread according to one embodiment.
Figure 4B:
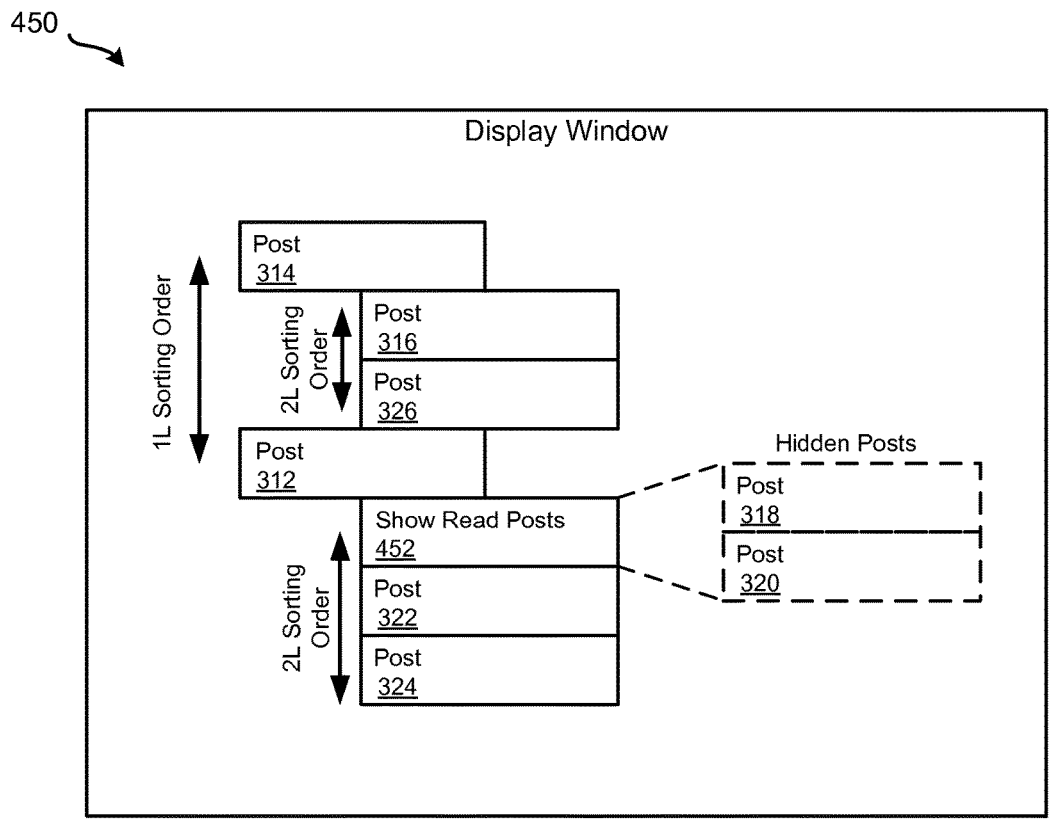
FIG. 4B illustrates a graphical representation of discussion thread 410 of FIG. 4A presented within a display window according to one embodiment.

FIG. 4A illustrates an exemplary discussion thread according to one embodiment. As shown, discussion thread 410 is similar to discussion thread 310 in that the discussion threads have the same posts in the same hierarchy. However in discussion thread 410, post 318 and post 320 has been previously read by the viewer (as designated by 318-R and 320-R). FIG. 4B illustrates a graphical representation of discussion thread 410 of FIG. 4A presented within a display window according to one embodiment. Discussion thread engine 115 can process a discussion thread and generate the graphical representation shown in display window 450. Here, discussion thread engine 115 has hidden posts which have been read from display window 450. Instead of showing posts which have been read, discussion thread engine 115 can generate show read posts icon 452 which is used to represent the hidden posts in display window 450. As shown, show read posts icon 452 represents posts 318 and 320 which have been hidden from display window 450 since the posts have been read.

Depending on the implementation, discussion thread engine 115 can hide read posts depending on one or more conditions. In one embodiment, discussion thread engine 115 can automatically hide posts which have been previously read by the viewer. In another embodiment, discussion thread engine 115 can first determine that the dimensions of display window 450 are insufficient to present the discussion thread in its entirety. Once that determination is made, discussion thread engine 115 can hide posts which have been previously read to reduce the size of the graphical representation of the discussion thread so that display window 450 can be populated with posts which have not been read by the viewer. In one example, discussion thread engine 115 can recursively hide read posts until the visualization of the discussion thread fits within the boundaries of display window 450. In another example, discussion thread engine 115 can estimate the number of posts which are to be hidden so that the visualization fits within the boundaries of display window 450. Once the estimate is calculated, discussion thread engine 115 can remove the estimated number of read posts from the visualization. If the new size of the visualization of the discussion thread is still larger than available area, then the step can be repeated.

In one embodiment, discussion thread engine 115 can display one or more hidden posts in response to an instruction from the viewer. For example, the instruction can be the selection of show read posts icon 452. Hidden posts can be displayed in line in the graphical representation. The resulting graphical representation would be as shown in display window 350 of FIG. 3B. If showing the hidden posts result in a graphical representation which is larger than the display area, then display window 450 can be scrollable, thus allowing the viewer to scroll and examine the entire discussion thread. In some examples, the number of hidden posts which are displayed can vary depending on the space available in display window 450. For instance, post 320 can be displayed while post 318 remains hidden if the space available in display window 450 in insufficient to display all the hidden posts.

Figure 4C:
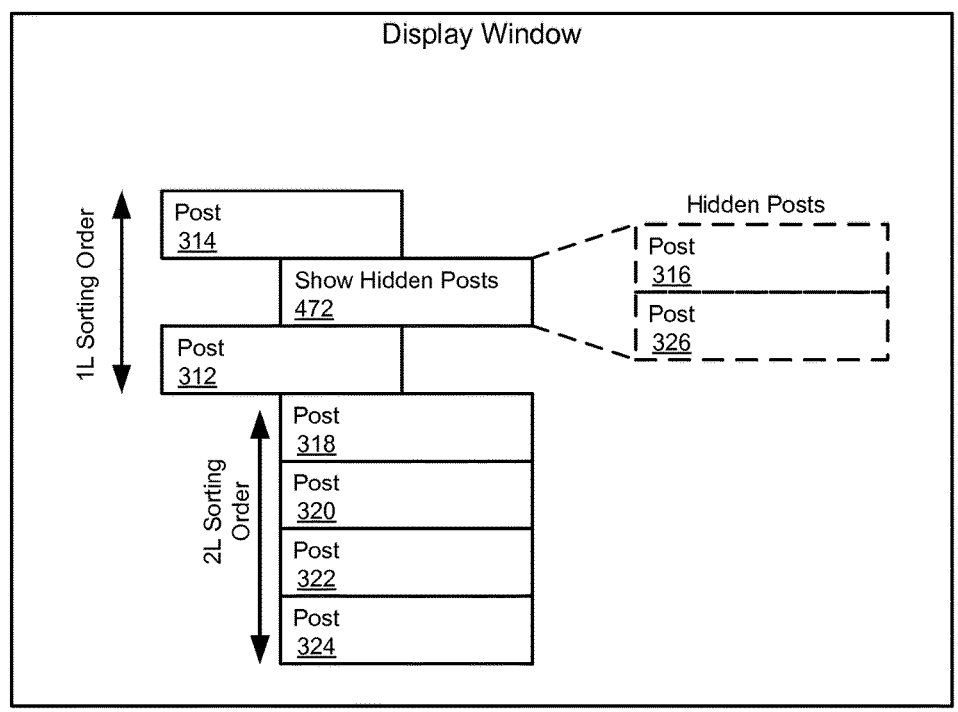
FIG. 4C illustrates a graphical representation of discussion thread 450 of FIG. 4A presented within a display window according to another embodiment.

In another embodiment, discussion thread engine 115 can simultaneously remove posts from the graphical representation as other posts are being introduced to allow the graphical representation to maintain approximately the same size. FIG. 4C illustrates a graphical representation of discussion thread 450 of FIG. 4A presented within a display window according to another embodiment. Display window 470 can be presented in response to detecting a selection of show read posts 452 of FIG. 4B. As discussion thread engine 315 introduces hidden posts 318 and 320 into the graphical representation, discussion thread engine 315 can also remove other posts from the graphical representation. This can help minimize changes to the size of the graphical representation. Advantages include maintaining the size of the graphical representation, thus avoiding the need to scroll around display window 470. Here, discussion thread engine 115 removes posts which belong to another first level post 314 when adding in posts 318 and 320. As shown, post 316 and 318 are removed from the graphical representation and replaced with show hidden posts icon 472. If posts 316 and 318 have been read, show hidden posts icon 472 can be instead a show read posts icon.

While exploring a discussion thread, a viewer may be interested in backtracking through the discussion thread. Backtracking allows the viewer to review the history of the discussion thread to determine the context in which posts are made. For instance, let's assume the viewer reads a post stating "I agree." Without reviewing the parent of the post, the viewer is unable to determine what the poster is agreeing with. In some embodiments, discussion thread engine 115 can examine each post to determine whether the post was generated in response to another post within the discussion thread. If the post was generated in response to another post (i.e., parent post), then discussion thread engine 115 can present a link along with the post that leads to the parent post. In one embodiment, discussion thread engine 115 can present the parent post within the display window when the link is selected. This can be applicable if the parent post is scrolled outside the display window or if the parent post is currently hidden from the display window. In another embodiment, discussion thread engine 115 can reorient the discussion thread in the display window such that the post or the parent post is positioned centrally to the display window. For example, the post (or the parent post) can be positioned substantially towards the center of the display window (horizontally, vertically, or both). Advantages of repositioning the discussion thread include attempting to reorient the discussion thread so that posts nearby the post of interest (e.g., the post having the selected link or the parent post) are visible within the display window to provide context to the viewer.

Figure 5A:
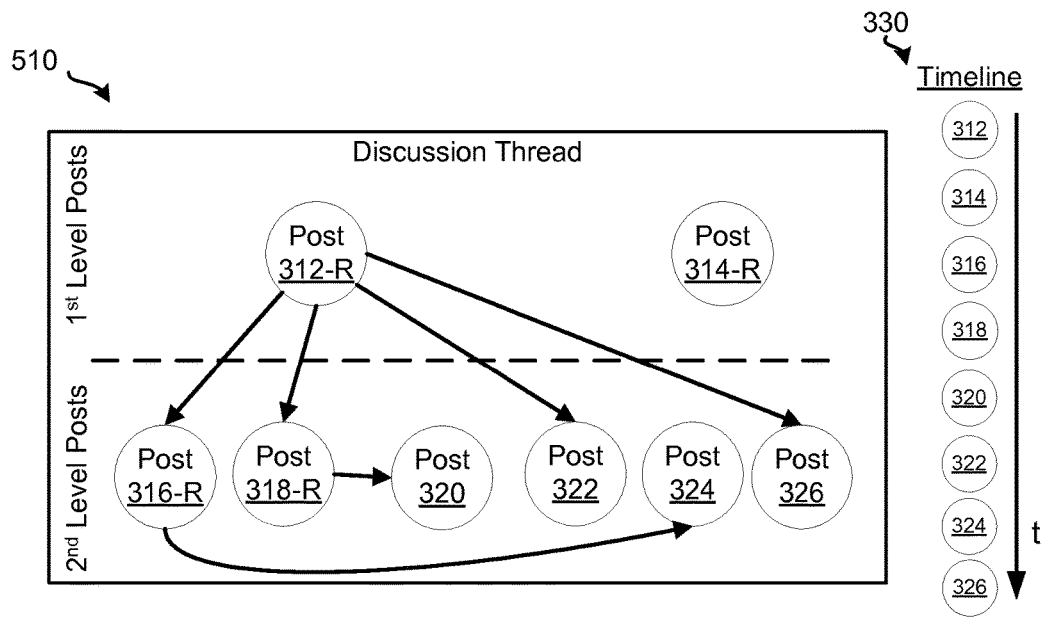
FIG. 5A illustrates a discussion thread according to one embodiment.

FIG. 5A illustrates a discussion thread according to one embodiment. As shown, discussion thread 510 includes posts 312, 314, 316, 318, 320, 322, 324, and 326. Posts 312, 314, 316, and 318 have already been read by the viewer, as identified by the annotation "-R". Discussion thread 310 further includes arrows used to signify the relationships between different posts within discussion thread 510. The head of an arrow points to a child post while the tail of the arrow touches the parent post associated with the child post. For example, the arrow connecting post 316 to post 324 means that post 324 was generated in response to post 316. Similarly, the arrow connecting post 312 and 322 means that post 322 was generated in response to post 312. Timeline 330 shows the order in which the posts in discussion thread 510 were generated.

Figure 5B:
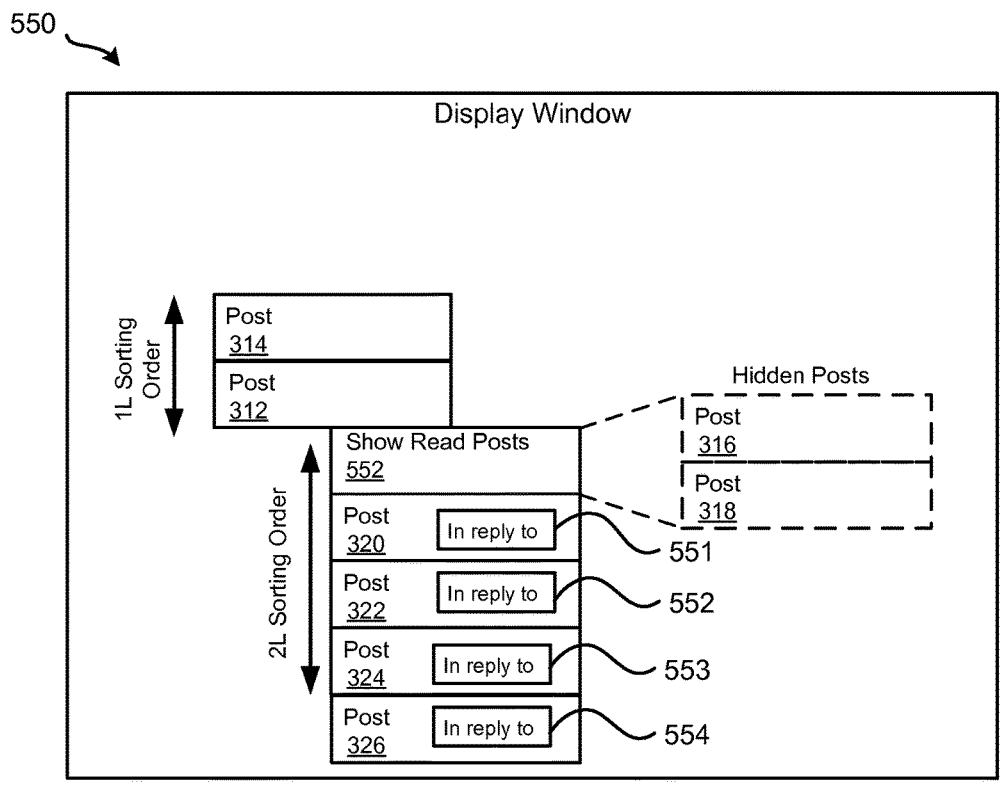
FIG. 5B illustrates a graphical representation of discussion thread 510 of FIG. 5A presented within a display window according to one embodiment.

FIG. 5B illustrates a graphical representation of discussion thread 510 of FIG. 5A presented within a display window according to one embodiment. As shown, the graphical representation is presented within display window 550. The graphical representation includes post 314 and post 312 which are being presented according to a first sorting order, that being newest-first. The reply grouping associated with post 312 are then presented below post 312 with a small indention. Posts within the reply grouping are sorted according to a second sorting order, that being oldest-first.

The reply grouping includes show read posts icon 552 which represents posts 316 and 318. Discussion thread engine 115 can hide posts 316 and 318 from the graphical representation and instead replace the hidden posts with show read posts icon 452 in response to determining that the reply grouping includes read posts. In one embodiment, discussion thread engine 115 can automatically hide posts which are read while in other embodiments, discussion thread engine 115 can hide posts which are read when there is insufficient space in display window 550 to present the discussion thread. For the visible second level posts, discussion thread engine 115 has includes a "in reply to" link for each post. For example, post 320 includes link 551, post 322 includes link 552, post 324 includes link 553, and post 326 includes link 554. A link for a current post can point to another post in discussion thread 510 which the current post was generated in response to.

When discussion thread engine 115 detects that a "in reply to" link has been selected, discussion thread engine 115 can check whether the parent post is already displayed within display window 450. The parent post may not be displayed within display window 450 for at least two reasons. In the first scenario, the parent post may not be displayed within display window 450 if scrolling has resulted in the parent post being scrolled outside of display window 450. If the parent post has been scrolled outside of display window 450, discussion thread engine 115 can reposition the graphical representation such that the current post with the selected link and the parent post are both displayed within the display window. The parent post can be positioned substantially towards the middle of display window 450. In some examples, the number of posts that are between the current post and the parent post may prevent both of them to be presented simultaneously within display window 450. In these scenarios, discussion thread engine 115 can optionally hide posts that are in between the current post and the parent post, thus reducing the space in between the two posts.

In the second scenario, the parent post may not be displayed within display window 450 if the parent post is hidden and thus is not included within the graphical representation. The parent post may be hidden because the parent post has been previously read. For example, posts 316 and 318 are currently hidden because they have been previously read. If the parent post is hidden, discussion thread engine 115 can introduce the parent post into the graphical representation. In one example, the parent post can be introduced inline with the other posts within the reply grouping. For example, the parent post can be introduced at a position within the reply grouping based on the second level sorting order.

For example, selecting link 551 can result in the discussion thread engine 115 determining that post 318 is currently hidden. Discussion thread engine 115 can introduce post 318 into the graphical representation. In one example, that post 312 is centered within display area 450. In another example, selecting link 552 or link 554 can result in discussion thread engine 115 determining that post 312 is visible. In response to visible post 312, discussion thread engine 115 can reposition the graphical representation such that post 312 is positioned substantially near the middle of display window 550. In another example, selecting link 553 can result in post 316 being added to the graphical representation rather than being hidden since post 324 is in response to post 316. Post 316 can be inserted into the reply grouping for post 312 above post 320 since post 316 is generated at an earlier time than post 320. In one example, show read posts icon 552 can be remain a header prior to the listing of visible posts in the reply grouping. In another example, show read posts icon 552 can appear inline along with the other posts within the reply grouping based on the sorting order and the posts that are hidden within show read posts icon 552. In some embodiments, discussion thread engine 115 can hide other posts within the discussion thread to make room for displaying the parent post simultaneously with the reply post which the "in reply to" link was selected. It can be advantageous to simultaneously display both of these posts within display window 550 so that the viewer can obtain the context in which the posts were made.

Figure 6:
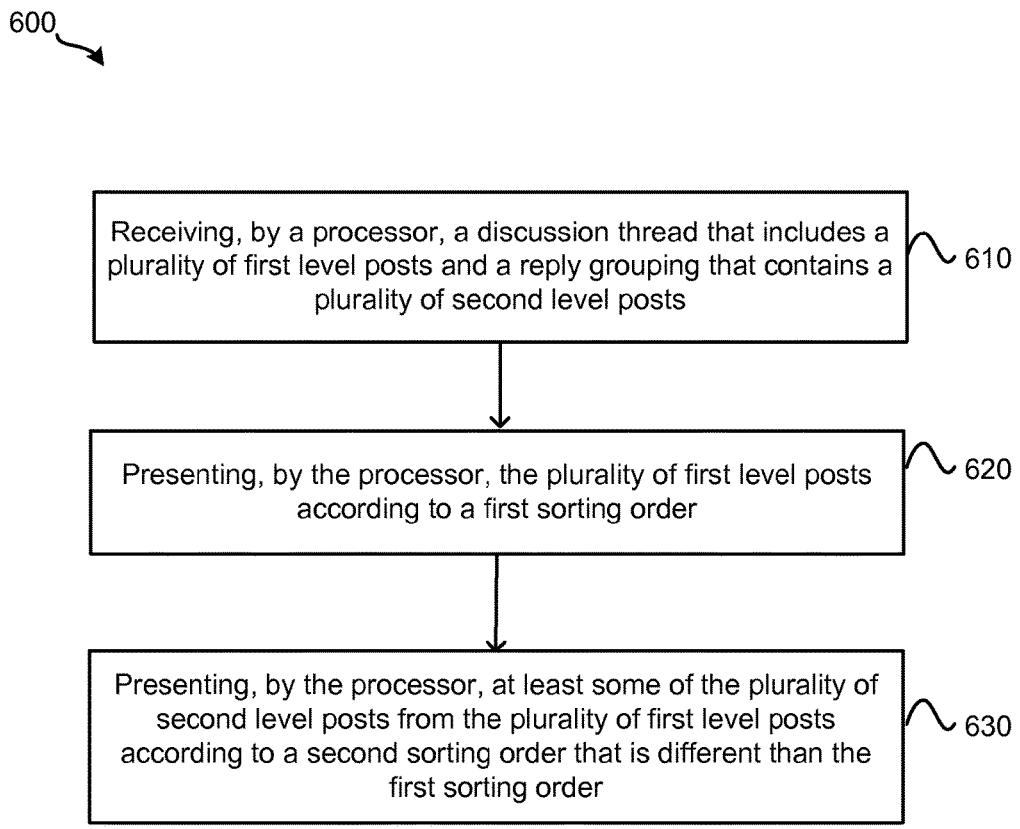
FIG. 6 is an example flow chart illustrating a process for presenting a discussion thread, in accordance with one embodiment.

FIG. 6 is an example flow chart illustrating a process for presenting a discussion thread, in accordance with one embodiment. Process 600 can implemented within a computer system to generate a graphical representation of the discussion thread. In one embodiment, the computer system is equipped with one or more processors and memory storing one or more programs for execution by the one or more processors. One processor can be implemented as discussion thread engine 115 shown in FIG. 1. Process 600 begins by receiving, by a processor, a discussion thread that includes a plurality of first level posts and a reply grouping that contains a plurality of second level posts at step 610. Each of the second level posts can be made in response to (or in reply to) a first level post or another second level post.

After receiving the discussion thread, process 600 can continue by presenting, by the processor, the plurality of first level posts according to a first sorting order at 620. The first sorting order can be defined by the viewer as one of oldest-first sorting order, newest-first sorting order, most-likes-first sorting order, and most-responses-first sorting order. In one embodiment, the process can include first sorting the first level posts according to the first sorting order. The sorted first level posts can then be presented in accordance to a presentation scheme. For example, the presentation scheme can specify the manner in which first level posts are presented within the graphical representation.

After presenting the first level posts, process 600 can continue by presenting, by the processor, at least some of the plurality of second level posts from the plurality of first level posts according to a second sorting order that is different than the first sorting order at 630. In one embodiment, process 600 can first sort the second level posts according to the second sorting order and then present the sorted second level posts. The second level posts can be presented in accordance to the presentation scheme. For example, the presentation scheme can specify that second level posts appear slightly indented from the first level post which the second level post is generated in response to, either directly or indirectly. The presentation of the first level posts and the second level posts can form the graphical representation. In some embodiments, the presentation scheme can specify rules that define when and how posts within the discussion thread are hidden from the graphical representation to reduce the size of the graphical representation. For example, one rule can specify that posts which have been read by the viewer are hidden to minimize the size of the graphical representation. The rule can be applied automatically or when the graphical representation is larger than the display area. Advantages of reducing the size of the graphical representation so that it fits within the display area include prioritizing what is shown in the display area to posts which are new to the viewer. Furthermore, by fitting the graphical representation into the display area, scrolling tools can be avoided, thus simplifying the user interface for the viewer. In one embodiment, the process can also generate an "in reply to" link for posts which were generated in response to another post (e.g., parent post). Selecting the link can cause the parent post to be displayed within the display area. Advantages of the "in reply to" link include simultaneously presenting the child post and the parent post within the display area so that the viewer can obtain context to the content within the child post.

Figure 7:
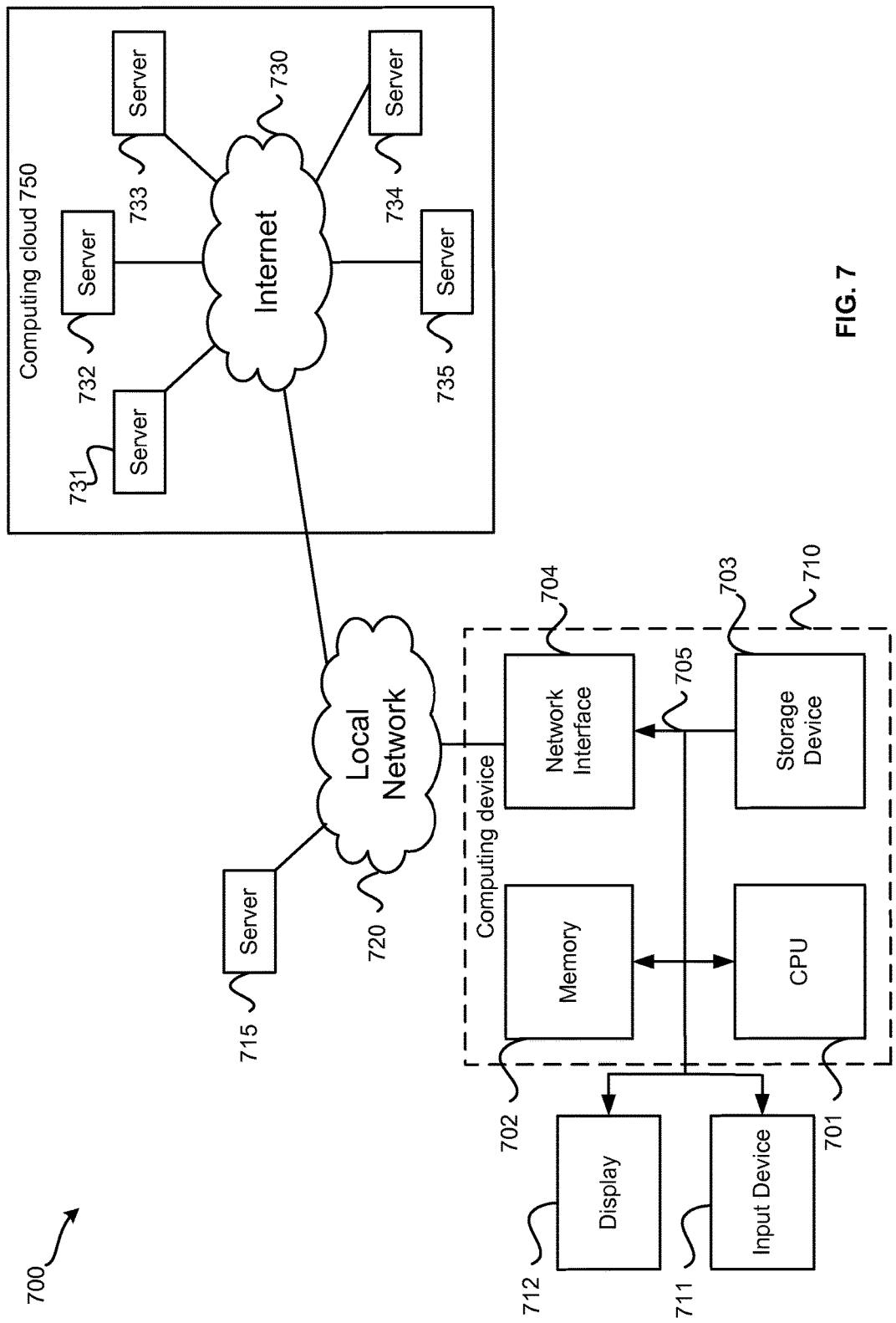
FIG. 7 illustrates an example of a computer system.

FIG. 7 is an example block diagram illustrating an example computing system for debugging in a production environment, in accordance with one embodiment. As shown in FIG. 7, in one embodiment, the computing system 710 includes a bus 706 or other communication mechanism for communicating information, and a processor 701 coupled with the bus 705 for processing information. In one embodiment, the computing system 710 also includes a memory 702 coupled to bus 706 for storing information and instructions to be executed by processor 701, including information and instructions for performing the techniques described above, for example. In one embodiment, the memory 702 may also be used for storing variables or other intermediate information during execution of instructions to be executed by processor 701. In one embodiment, the memory 702 includes, but is not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 703 may include source code, binary code, or software files for performing the techniques above, for example. The storage device 703 and the memory 702 are both examples of computer readable mediums.

In one embodiment, the computing system 710 may be coupled via the bus 706 to a display 712, such as a cathode ray tube (CRT) or liquid crystal display (LCD), for displaying information to a user. An input device 711 such as a keyboard and/or mouse is coupled to the bus 705 for communicating information and command selections from the user to the processor 701. The combination of these components allows the user to communicate with the computing system 710. In some systems, the bus 706 may be divided into multiple specialized buses.

In one embodiment, the computing system 710 includes a network interface 704 coupled with the bus 705. In one embodiment, the network interface 704 provides two-way data communications between the computing system 710 and the local network 720. In one embodiment, the network interface 707 includes a digital subscriber line (DSL) or a modem to provide data communication connection over a telephone line, for example. Another example of the network interface 704 is a local area network (LAN) card to provide a data communication connection to a compatible LAN. Wireless links are another example. In any such implementation, the network interface 704 sends and receives electrical, electromagnetic, or optical signals that carry digital data streams representing various types of information.

In one embodiment, the computing system 710 sends and receives information, including messages or other interface actions, through the network interface 704 across a local network 720, an Intranet, or the Internet 730. In one embodiment, the local network, the computing system 710 communicates with a plurality of other computer machines, such as a server 715 or a computing cloud 750. In one embodiment, the computing system 710 and server computer systems represented by the server 715 form a cloud computing network, which may be programmed with processes described herein. In the Internet example, software components or services may reside on multiple different computing systems 710 or servers 731-735 across the network. In one embodiment, the processes described above are implemented at computing cloud 750, which includes one or more servers from the servers 731-735. In one embodiment, the server 731 transmits actions or messages from one component, through the Internet 730, the local network 720, and the network interface 704 to a component of the computing system 710. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the "first request" are renamed consistently and all occurrences of the "second request" are renamed consistently. The first request and the second request are both requests, but they are not the request.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

The invention claimed is:

1. A computer-implemented method comprising:
receiving, by a processor, a request from a client device for a discussion thread that includes a plurality of first level posts and a reply grouping that contains a plurality of second level posts, wherein each second level post in the plurality of second level posts is made in response to one of the first level posts in the plurality of first level posts or a second level post in the plurality of second level posts;
sorting, by the processor, the plurality of first level posts according to a first sorting order that orders the plurality of first level posts from newest to oldest;
sorting, by the processor, the plurality of second level posts according to a second sorting order that orders the plurality of second level posts from oldest to newest;
presenting, by the processor, on the client device the plurality of first level posts sorted according to the first sorting order by presenting newer posts in the plurality of first level posts towards a first direction and presenting older posts in the plurality of first level posts in a second direction opposite the first direction; and
presenting, by the processor, on the client device the plurality of second level posts sorted according to the second sorting order by presenting older posts in the plurality of second level posts towards the first direction and presenting newer posts in the plurality of second level posts in the second direction.

2. The computer-implemented method of claim 1, wherein the plurality of first level posts are made in response to a topic of interest.

3. The computer-implemented method of claim 1, wherein the first sorting order is user defined.

4. The computer-implemented method of claim 3, wherein the second sorting order is predefined.

5. The computer-implemented method of claim 1, wherein each post in the plurality of second level posts comprises a table for storing an indication whether a user account has viewed the post, wherein presenting at least some of the plurality of second level posts comprises:
identifying, by the processor, a subset of second level posts from the plurality of second level posts which have been previously read by a user account based on the indication stored in the table of each post in the plurality of second level posts;
presenting, by the processor, on the client device second level posts from the plurality of second level posts other than the subset of second level posts; and
hiding, by the processor, the subset of second level posts by presenting on the client device an icon that represents the subset of the second level posts in between the first level post and the presented second level posts from the plurality of second level posts other than the subset of second level posts.

6. The computer-implemented method of claim 5 further comprising:
detecting, by the processor, selection of the icon; and
in response to the detection, presenting, by the processor, on the client device the subset of second level posts inline with the presented second level posts and removing the icon from the client device, wherein the subset of second level posts and the remaining second level posts are organized according to the second sorting order.

7. The computer-implemented method of claim 5 further comprising determining, by the processor, that the presentation of the plurality of second level posts extend outside an available area configured for presenting the discussion thread, wherein identifying the subset, presenting the remaining second level posts, and presenting the icon are performed in response to the determination.

8. A non-transitory computer readable storage medium storing one or more programs, the one or more programs comprising instructions, which when executed by a processor, cause the processor to execute a method of:
receiving a request from a client device for a discussion thread that includes a plurality of first level posts and a reply grouping that contains a plurality of second level posts, wherein each second level post in the plurality of second level posts is made in response to one of the first level posts in the plurality of first level posts or a second level post in the plurality of second level posts;
sorting, by the processor, the plurality of first level posts according to a first sorting order that orders the plurality of first level posts from newest to oldest;
sorting, by the processor, the plurality of second level posts according to a second sorting order that orders the plurality of second level posts from oldest to newest;
presenting on the client device the plurality of first level posts sorted according to the first sorting order by presenting newer posts in the plurality of first level posts towards a first direction and presenting older posts in the plurality of first level posts in a second direction opposite the first direction; and
presenting on the client device the plurality of second level posts sorted according to the second sorting order by presenting older posts in the plurality of second level posts towards the first direction and presenting newer posts in the plurality of second level posts in the second direction.

9. The non-transitory computer readable storage medium of claim 8, wherein the plurality of first level posts are made in response to a topic of interest.

10. The non-transitory computer readable storage medium of claim 8, wherein the first sorting order is user defined.

11. The non-transitory computer readable storage medium of claim 10, wherein the second sorting order is predefined.

12. The non-transitory computer readable storage medium of claim 8, wherein each post in the plurality of second level posts comprises a table for storing an indication whether a user account has viewed the post, wherein presenting at least some of the plurality of second level posts comprises:
identifying a subset of second level posts from the plurality of second level posts which have been previously read by a user account based on the indication stored in the table of each post in the plurality of second level posts;
presenting on the client device second level posts from the plurality of second level posts other than the subset of second level posts; and
hiding the subset of second level posts by presenting on the client device an icon that represents the subset of the second level posts in between the first level post and the presented second level posts from the plurality of second level posts other than the subset of second level posts.

13. The non-transitory computer readable storage medium of claim 12, wherein the instructions further cause the processor to execute the method of:
detecting selection of the icon; and
in response to the detection, presenting on the client device the subset of second level posts inline with the presented second level posts and removing the icon from the client device, wherein the subset of second level posts and the remaining second level posts are organized according to the second sorting order.

14. The non-transitory computer readable storage medium of claim 12, wherein the instructions further cause the processor to execute the method of determining that the presentation of the plurality of second level posts extend outside an available area configured for presenting the discussion thread, wherein identifying the subset, presenting the remaining second level posts, and presenting the icon are performed in response to the determination.

15. A computer implemented system, comprising:
one or more computer processors; and
a non-transitory computer-readable storage medium comprising instructions that, when executed, control the one or more computer processors to be configured for:
receiving a request from a client device for a discussion thread that includes a plurality of first level posts and a reply grouping that contains a plurality of second level posts, wherein each second level post in the plurality of second level posts is made in response to one of the first level posts in the plurality of first level posts or a second level post in the plurality of second level posts;
sorting, by the processor, the plurality of first level posts according to a first sorting order that orders the plurality of first level posts from newest to oldest;
sorting at least some of the plurality of second level posts according to a second sorting order that orders the plurality of second level posts from oldest to newest;
presenting on the client device the plurality of first level posts sorted according to the first sorting order by presenting newer posts in the plurality of first level posts towards a first direction and presenting older posts in the plurality of first level posts in a second direction opposite the first direction; and
presenting on the client device the plurality of second level posts sorted according to the second sorting order by presenting older posts in the plurality of second level posts towards the first direction and presenting newer posts in the plurality of second level posts in the second direction.

16. The computer implemented system of claim 15, wherein the first sorting order is user defined.

17. The computer implemented system of claim 16, wherein the second sorting order is predefined.

18. The computer implemented system of claim 17, wherein each post in the plurality of second level posts comprises a table for storing an indication whether a user account has viewed the post, wherein presenting at least some of the plurality of second level posts comprises:
identifying a subset of second level posts from the plurality of second level posts which have been previously read by a user account based on the indication stored in the table of each post in the plurality of second level posts;
presenting on the client device second level posts from the plurality of second level posts other than the subset of second level posts; and
hiding the subset of second level posts by presenting on the client device an icon that represents the subset of the second level posts in between the first level post and the presented second level posts from the plurality of second level posts other than the subset of second level posts.

19. The computer implemented system of claim 18, wherein the instructions further control the one or more computer processors to be configured for:
detecting selection of the icon; and
in response to the detection, presenting on the client device the subset of second level posts inline with the presented second level posts and removing the icon from the client device, wherein the subset of second level posts and the remaining second level posts are organized according to the second sorting order.

20. The computer implemented system of claim 18, wherein the instructions further control the one or more computer processors to be configured for determining that the presentation of the plurality of second level posts extend outside an available area configured for presenting the discussion thread, wherein identifying the subset, presenting the remaining second level posts, and presenting the icon are performed in response to the determination.

* * * * *